(12) United States Patent  (10) Patent No.: US 7,118,330 B2
Tsuru et al.  (45) Date of Patent: Oct. 10, 2006

(54) TURBINE NOZZLE AIRFOIL (75) Inventors: Atsushi Tsuru, Nishitokyo (JP); Keiji Nishimura, Sayama (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 243 days.

(21) Appl. No.: 10/791,795

(22) Filed: Mar. 4, 2004

(65) Prior Publication Data

US 2005/0008485 A1  Jan. 13, 2005

(30) Foreign Application Priority Data

Mar. 12, 2003  (JP) .............................. 2003-065994

(51) Int. Cl.
*F01D 5/14* (2006.01)
*F01D 9/02* (2006.01)

(52) U.S. Cl. ............. 415/191; 416/DIG. 2; 416/223 A; 416/243

(58) Field of Classification Search .......... 416/DIG. 2, 416/223 A, 243; 415/191, 208.2
See application file for complete search history.

(56) References Cited

U.S. PATENT DOCUMENTS 5,779,443 A * 7/1998 Haller et al. ................. 415/191
6,398,498 B1   6/2002 Boyesen
6,491,493 B1  12/2002 Watanabe et al.

FOREIGN PATENT DOCUMENTS

EP  0 441 097  8/1991
JP  10-196303  7/1998

OTHER PUBLICATIONS

Patent Abstracts of Japan, JP 10-131707, May 19, 1998.

* cited by examiner

*Primary Examiner*—Edward K. Look
*Assistant Examiner*—Richard A. Edgar
(74) *Attorney, Agent, or Firm*—Oblon, Spivak, McClelland, Maier & Neustadt, P.C.

(57) ABSTRACT

An easily producible turbine nozzle for a gas turbine engine is provided, which is capable of preventing flutter of the turbine nozzle during operation of the gas turbine engine. The turbine nozzle comprises airfoils stacked along the stacking axis. The high curvature portions on suction surface in airfoil section successively formed along the stacking axis of the airfoil describe a parabola line that curves toward the pressure side of the airfoil when seen from the front or rear of the turbine nozzle. The high curvature portions on suction surface in airfoil section curve most at the center along the stacking axis of the airfoil from a straight line that connects with a first intersection between the parabola line and an inner band in the turbine nozzle and with a second intersection between the parabola line and an outer band in the turbine nozzle. The maximum curvature falls within a range from 0.02 to 0.03-fold of the stacking axis of the airfoil.

16 Claims, 6 Drawing Sheets

TURBINE NOZZLE AIRFOIL

The present disclosure relates to subject matters contained in Japanese Patent Application No. 2003-065994, filed on Mar. 12, 2003, the disclosure of which is expressly incorporated herein by reference in its entirety.

BACKGROUND OF THE INVENTION

1. Field of the Invention

The present invention relates to a turbine nozzle for a gas turbine engine and more particularly to a turbine nozzle having curved airfoil that describe a parabola line toward the pressure side along the airfoil stacking axis.

2. Description of the Related Art

A conventional or inventive turbine nozzle is employed in a gas turbine engine, which is described first with respect to its brief configuration.

Figure 1:
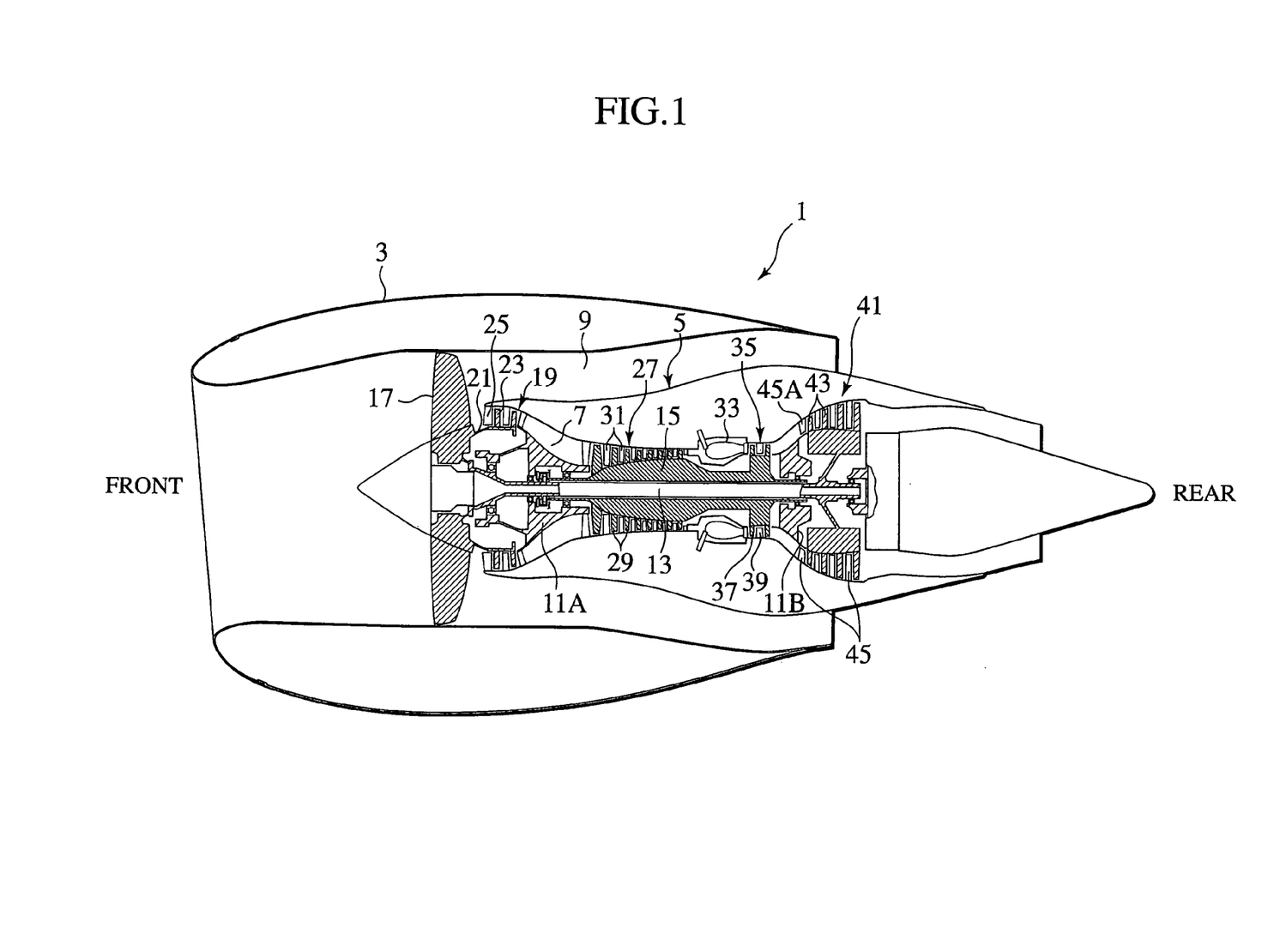
FIG. 1 is a cross-sectional view showing a brief configuration of a gas turbine engine.

FIG. 1 is a cross-sectional view showing a brief configuration of a gas turbine engine 1.

The gas turbine engine 1 is employed, for example, as a jet engine in an airplane. It is an engine configured to jet a high-temperature high-pressure combustion gas to provide a propelling force or a rotating force.

The gas turbine engine 1 comprises an engine outer cylinder 3 and, inside the engine outer cylinder 3, a hollow engine casing 5 arranged integrally and substantially coaxial with the engine outer cylinder 3 as base. An annular engine flow path 7 is formed in the engine casing 5. An annular by-pass flow path 9 is formed between the engine outer cylinder 3 and the engine casing 5.

At an inner front portion in the engine casing 5 (an upstream portion seen from the direction of gas flow), interposing the engine flow path 7, a front support frame 11A is formed integrally with the engine casing 5. At an inner rear portion in the engine casing 5, interposing the engine flow path 7, a rear support frame 11B is formed integrally with the engine casing 5. The front support frame 11A and the rear support frame 11B support a low-pressure turbine shaft 13 rotatably via bearings. In addition, the front support frame 11A and the rear support frame 11B support a hollow high-pressure turbine shaft 15 rotatably via bearings and coaxially with the low-pressure turbine shaft 13.

At the front end of the low-pressure turbine shaft 13, a fan 17 is provided to send air into the engine flow path 7 and the by-pass flow path 9.

At a location upstream from the engine flow path 7, a low-pressure compressor 19 is provided. The low-pressure compressor 19 is employed to compress air at low pressure and send it to downstream (seen from the direction of gas flow; and the right side in FIG. 1).

The low-pressure compressor 19 includes an annular airfoil support member 21 located downstream from the fan 17 and arranged integrally with the low-pressure turbine shaft 13. In addition, a row of multi-stage moving airfoils for low-pressure compression 23 is provided at the perimeter of the airfoil support member 21 along the engine flow path 7. Finally, a row of multi-stage stationary airfoils for low-pressure compression 25 is provided inside the engine casing 5 along the engine flow path 7 so as to alternatively interleave with the row of multi-stage moving airfoils for low-pressure compression 23.

At a location downstream from the low-pressure compressor 19 in the engine flow path 7, a high-pressure compressor 27 is provided. The high-pressure compressor 27 is employed to high-pressure compress the air, which has been low-pressure compressed by the low-pressure compressor 19, and send it to downstream.

The high-pressure compressor 27 includes a row of multi-stage moving airfoils for high-pressure compression 29 provided along the engine flow path 7 on the high-pressure turbine shaft 15. In addition, a row of multi-stage stationary airfoils for high-pressure compression 31 is provided inside the engine casing 5 along the engine flow path 7 so as to alternatively interleave with the row of multi-stage moving airfoils for low-pressure compression 29.

At a location downstream from the high-pressure compressor 27 in the engine flow path 7, an annular combustion chamber 33 is formed. The combustion chamber 33 is employed to burn a fuel in a compressed air to produce a high-temperature high-pressure combustion gas.

At a location downstream from the combustion chamber 33 in the engine flow path 7, a high-pressure turbine 35 is provided. The high-pressure turbine 35 is configured to rotationally drive the high-pressure turbine shaft 15 in response to a rotating force caused by expansion of the high-temperature high-pressure combustion gas from the combustion chamber 33.

The high-pressure turbine 35 includes a row of multi-stage moving airfoils for high-pressure turbine 37 arranged on the high-pressure turbine shaft 15 along the engine flow path 7 and operative to rotate in response to the high-temperature high-pressure combustion gas. In addition, a row of multi-stage stationary airfoils for high-pressure turbine 39 is provided inside the engine casing 5 along the engine flow path 7 so as to alternatively interleave with the row of multi-stage moving airfoils for high-pressure turbine 37.

At a location downstream from the high-pressure turbine 35 in the engine flow path 7, a low-pressure turbine 41 is provided. The low-pressure turbine 41 is configured to rotationally drive the low-pressure turbine shaft 13 in response to a rotating force caused by expansion of the high-temperature high-pressure combustion gas from the combustion chamber 33.

The low-pressure turbine 41 includes a row of multi-stage moving airfoils for low-pressure turbine 43 arranged on the low-pressure turbine shaft 13 along the engine flow path 7 and operative to rotate in response to the high-temperature high-pressure combustion gas. In addition, a row of multi-stage stationary airfoils for low-pressure turbine 45 is provided inside the engine casing 5 along the engine flow path 7 so as to alternatively interleave with the row of multi-stage moving airfoils for low-pressure turbine 43. A turbine nozzle in the art or a turbine nozzle according to the present invention includes the row of stationary airfoils for low-pressure turbine 45.

The turbine nozzle is formed from nozzle airfoils (stator vane; hereinafter also referred to as simply "vane") arrayed in annular. In further detail, the turbine nozzle is formed from a plurality of stator vane, an annular inner band and outer band. For convenience of assembling and disassembling on maintenance, the turbine nozzle as a plurality of nozzle segment generally, may also be referred to as the turbine nozzle in the specification of the present application.

There are two methods to improve the stability to flutter for the vane. One is to increase the natural frequency on the lower order mode of airfoil. The other is to locate the torsional center (torsion center) of lower order modes for airfoil to a stable position.

Generally it is required to change airfoil shape, such a thickness, chord length etc, in order to implement the above methods.

Changing the sectional shape of the airfoil, may have a large influence on aerodynamic performance. In recent design of a high-efficiency turbine. (a low margin (design margin) is remained to change the sectional shape of the airfoil.) Therefore, it may be required to redesign the aerodynamic design in order to change airfoil shape, it is also required to satisfy the mechanical requirements (for example, a mechanical strength) simultaneously. Accordingly, it is difficult in some cases to change the sectional shape of the airfoil.

As disclosed in a patent publication 1 (Japanese Patent Application Laid-open No. H10-196303), there has been known a configuration with stacking of airfoils instead of changing the sectional shape of the airfoil. In this case, the middle portion along the stacking axis of the airfoil is protruded toward the pressure side of the airfoil to curve the airfoil. The stacking is herein defined as to stack the sectional shapes along the stacking axis to construct the shape of the airfoil.

The airfoil disclosed in the patent publication 1 is not provided with indication of specific features of the curve (for example, the shape of the curve and the degree of the curve). Therefore, some feature of the curve can not improve the stability to flutter for vane sufficiently during operation of the gas turbine engine 1 and may make it difficult to produce the turbine nozzle.

SUMMARY OF THE INVENTION

The present invention has been achieved in order to solve the above problems. It is an object of the invention to provide an easily redesign method for vane in order to prevent the flutter during operation of the gas turbine engine.

To achieve the object, according to an aspect of the present invention, there is provided a turbine nozzle comprising airfoils stacked along the stacking axis. The high curvature portions on suction surface in airfoil section (hereinafter "high-C") successively formed along the stacking axis of the airfoil describe a parabola line that curves toward the pressure side of the airfoil when seen from the front or rear of the turbine nozzle. The high-C curve most at the center along the stacking axis of the airfoil from a straight line that connects with a first intersection between the parabola line and an inner band in the turbine nozzle and with a second intersection between the parabola line and an outer band in the turbine nozzle. The maximum curvature falls within a range from 0.02 to 0.03-fold of the stacking axis of the airfoil.

According to the present invention, an effect can be achieved to provide an easily redesign method for vane in order to prevent the flutter during operation of the gas turbine engine.

DETAILED DESCRIPTION OF THE REFERRED EMBODIMENTS

Figure 2:
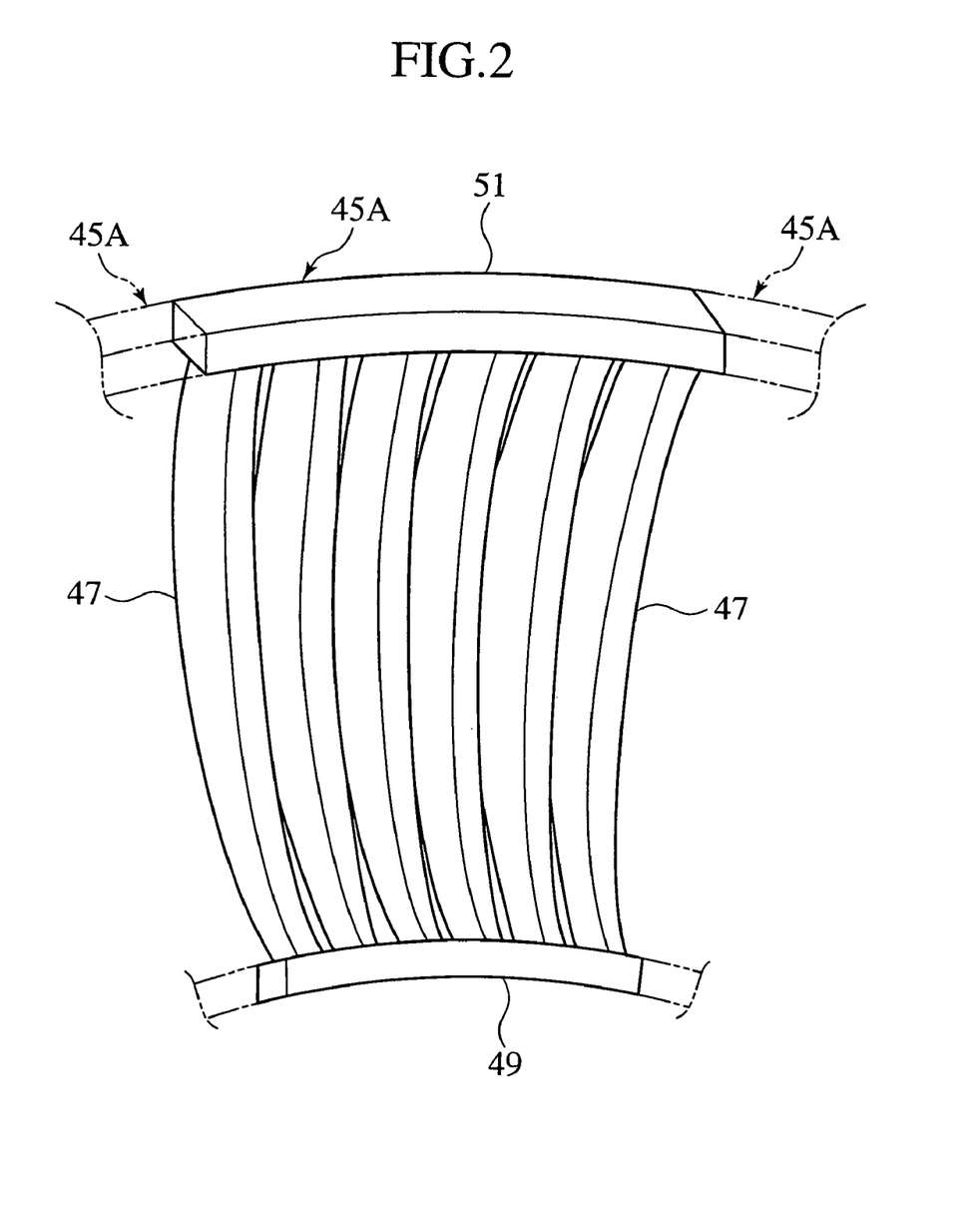
FIG. 2 is a perspective view showing a brief configuration of a turbine nozzle according to an embodiment of the present invention.

The above and further objects and novel features of the present invention will more fully appear from the following detailed description when the same is read in conjunction with the accompanying drawings, in which:

FIG. 2 is a perspective view showing a brief configuration of a turbine nozzle 45A according to an embodiment of the present invention.

Among the turbine nozzles that construct the row of stator vane for low-pressure turbine 45 in the gas turbine engine 1 shown in FIG. 1, the turbine nozzle 45A is arranged at the most front location (close to the high-pressure turbine 35). The front side of the page of FIG. 2 almost corresponds to the front of the gas turbine engine 1, and the rear side of the page of FIG. 2 almost corresponds to the rear of the gas turbine engine 1.

The gas turbine nozzle 45A includes a plurality of airfoil 47. Each airfoils 47 have inner band 49 and outer band 51 which are annular.

The gas turbine nozzle 45A is formed in an almost fan shape as described above. Plural such gas turbine nozzles 45A are combined together to form a ring-shaped gas turbine nozzle.

In the ring-shaped gas turbine nozzle, an annular inner band (a combination of plural inner bands 49) is located inwardly and, isolated from the annular inner band, an annular outer band (a combination of plural outer bands 51) is located outside and coaxially with the annular inner band substantially on the same plane. The plural airfoils 47 are provided between and integrally with the annular inner band and the annular outer band.

A feature of the airfoil 47 is described next in detail.

Figure 3:
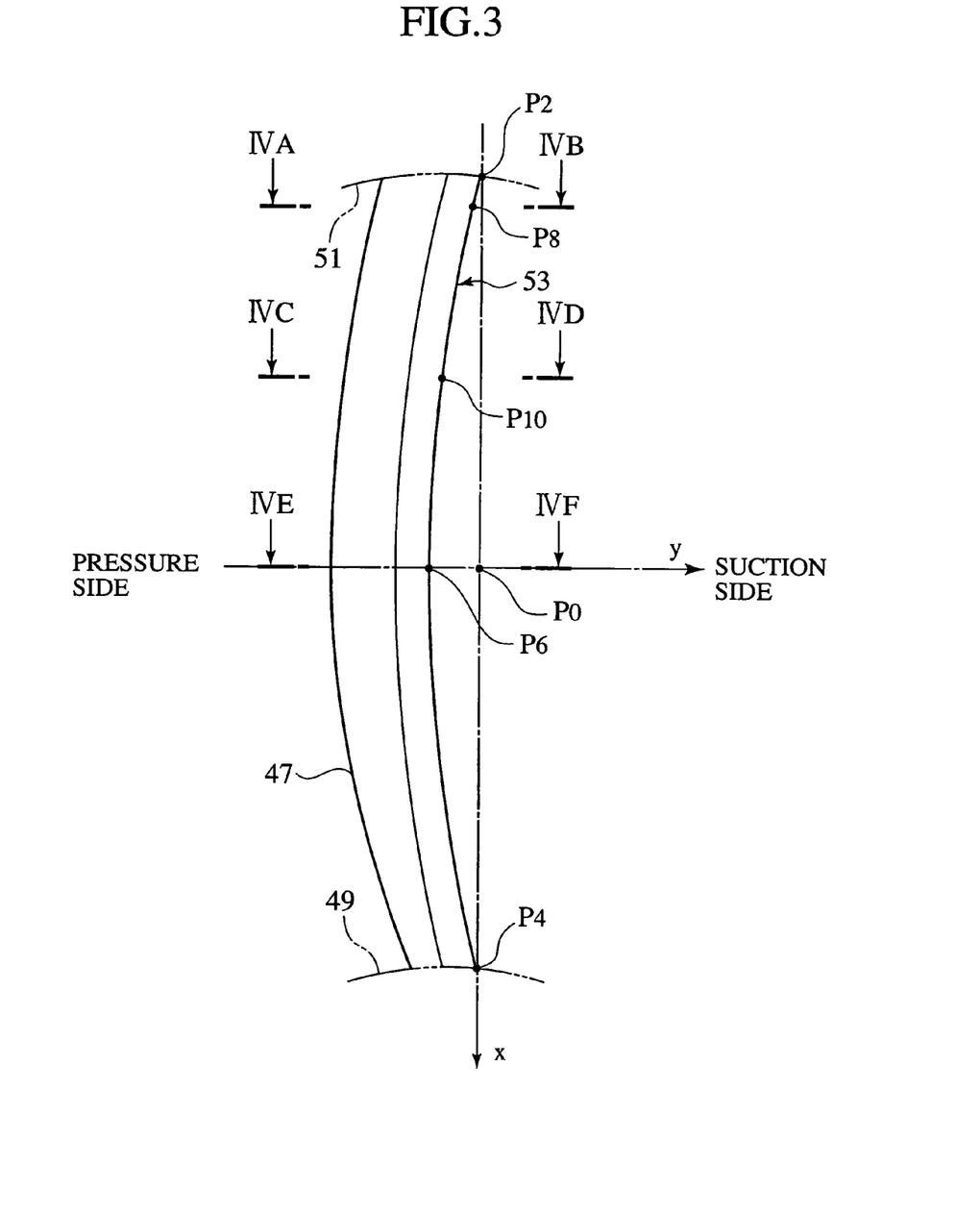
FIG. 3 shows a feature of a airfoil in the turbine nozzle.
Figure 4:
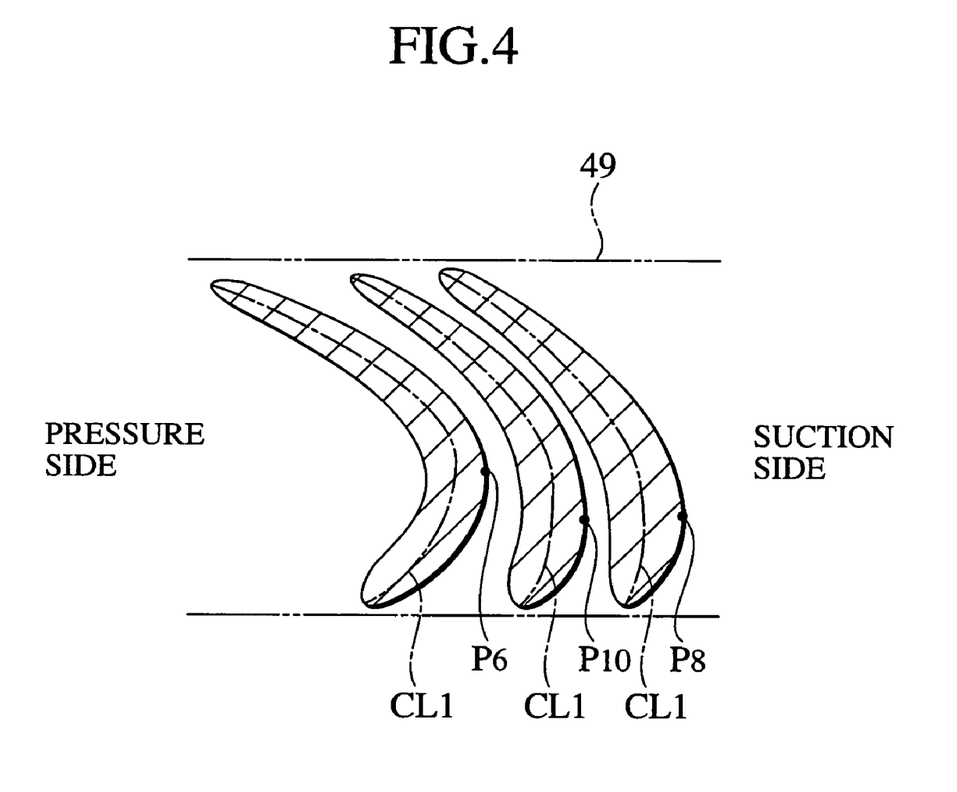
FIG. 4 shows another feature of the airfoil in the turbine nozzle.

FIGS. 3 and 4 show features of the airfoil 47.

FIG. 3 shows a feature of one of the airfoils 47 shown in FIG. 2 seen from the front of the gas turbine engine 1 (seen from the front of the gas turbine engine 1 in the direction parallel to the rotational axis of the low-pressure turbine shaft 13). FIG. 4 shows features of cross sections taken along lines of IVA–IVB, IVC–IVD and IVE–IVF in FIG. 3 while their relative positional relations are kept.

In FIG. 3, a cross-point (intersection) $P_2$ between the high-C of airfoil 47 and the outer band 51 is connected to a cross-point (intersection) $P_4$ between the high-C of airfoil 47 and the inner band 49 through a straight line. This straight line is referred to as the x-axis. A straight line, which passes through the central point $P_0$ on a segment that interconnects the cross-point $P_2$ and the cross-point $P_4$ and crosses the x-axis at right angle, is referred to as the y-axis.

The x-axis is defined as the direction along the length of the airfoil 47; the y-axis as the suction side-pressure side direction of the airfoil 47; and the direction orthogonal to the page of FIG. 3 as the direction along the width of the airfoil 47. The side at a protruded portion on the airfoil 47 (see FIG. 4), that is, the right side in FIG. 3 is referred to as the suction side of the airfoil 47. The side at a recessed portion in the airfoil 47(see FIG. 4), that is, the left side in FIG. 3 is referred to as the pressure side of the airfoil 47.

The high-C of airfoil 47 shown in FIG. 3 correspond to the high-C of airfoil 47 referred hereinbelow (an ensemble of the high curvature portions that are variable in accordance with locations along the stacking axis of the airfoils 47) when seen from the front or rear of the turbine nozzle (the front or rear of the gas turbine engine 1 parallel with the rotational axis of the low-pressure turbine shaft 13), which are formed successively along the stacking axis of the airfoil 47. As the airfoils 47 are stacked along the stacking axis, the high-C describe a parabola line, as shown in FIG. 3, which is a curve (secondary function curve; a parabola line) 53 that curves toward the pressure side of the airfoil 47. The high curvature portions $P_6$, $P_8$, $P_{10}$ shown in FIG. 4 correspond to the high curvature portions $P_6$, $P_8$, $P_{10}$ shown in FIG. 3, respectively.

Among the high-C on the curve 53, the high curvature portion $P_6$ is located closest to the pressure side (the pressure side of the airfoil 47) on the y-axis. As the y-axis is located through the center of the stacking axis of the airfoil 47, the curve 53 is curved most toward the pressure side of the airfoil 47 at the center of the stacking axis of the airfoil 47. In other words, the high-C of airfoil 47 is curved largest toward the pressure side at the center of the stacking axis of the airfoil 47.

The maximum curvature of the high-C of airfoil 47 (a distance between the high curvature portion $P_6$ and the central point $P_0$ shown in FIG. 3) has a value equal to 0.025-fold of the stacking axis of the airfoil 47 (a length of the segment that connects the intersection $P_2$ with the intersection $P_4$).

It is assumed that "h" denotes the length of the segment that connects the intersection $P_2$ with the intersection $P_4$. In addition, the right side (the suction side) in FIG. 3 corresponds to the positive zone on the Y-axis, and the lower side in FIG. 3 (the side of the inner band 49) corresponds to the positive zone on the x-axis. In this case, the intersection $P_2$ has coordinate values of $(-h/2, 0)$, the intersection $P_4$ has coordinate values of $(h/2, 0)$, and the high curvature portion $P_6$ has coordinate values of $(0, -0.025h)$. The curve 53 that passes through these three points can be represented by the following equation:

$$y=(0.1/h)x^2-0.025h$$

The value of "0.025" may be varied within a range between 0.02–0.03.

Analyzed results on flutter of the airfoil 47 in the turbine nozzle including the turbine nozzle 45A will be described next.

The flutter of the airfoil 47 is caused mainly in lower-order vibration modes. The lower-order vibration modes include a vibration mode 1 in which the airfoil 47 vibrates in the direction of suction side-pressure side connection, and a vibration mode 2 in which the airfoil 47 vibrates torsionally about the axis that extends along the stacking axis of the airfoil 47.

On analysis of the flutter, it is required to derive each location of a torsional center in the vibration modes 1 and 2 and estimate the stability of the airfoil 47 to the derived location of the torsional center. Specifically, from natural frequency of airfoil 47, the flow velocity of the gas and the representative length (chord length) of the airfoil 47 during operation of the gas turbine engine provided with the turbine nozzle 45A, a non-dimensional amount (Reduced Velocity) RV1 can be derived. This amount RV1 is compared with an allowable reduced velocity RV2 derived from the location of the torsional center. If the RV1 value is lower than the RV2 value, the airfoil 47 has stability to the flutter.

The non-dimensional amount RV1 is represented by:

$$RV1=v/(f\cdot d)$$

where "v" denotes a flow velocity of a fluid that passes through the airfoil 47; "f" indicates the natural frequency of the airfoil 47 in the vibration mode 1 or the vibration mode 2; and "d" is equal to ½ the chord length of the airfoil 47. The chord length corresponds to a length of the central line CL1 along the thickness of the airfoil 47 as shown in FIG. 4.

The non-dimensional amount RV2 can be derived from the torsional center in the vibration mode based on the following publication 2 (J. Panovsky, R. E. Keilb, "A Design Method to Prevent Low Pressure Turbine Blade Flutter", Vol. 122 January 2000, Journal of Engineering for Gas Turbine and Power, Transaction of ASME).

Figure 5:
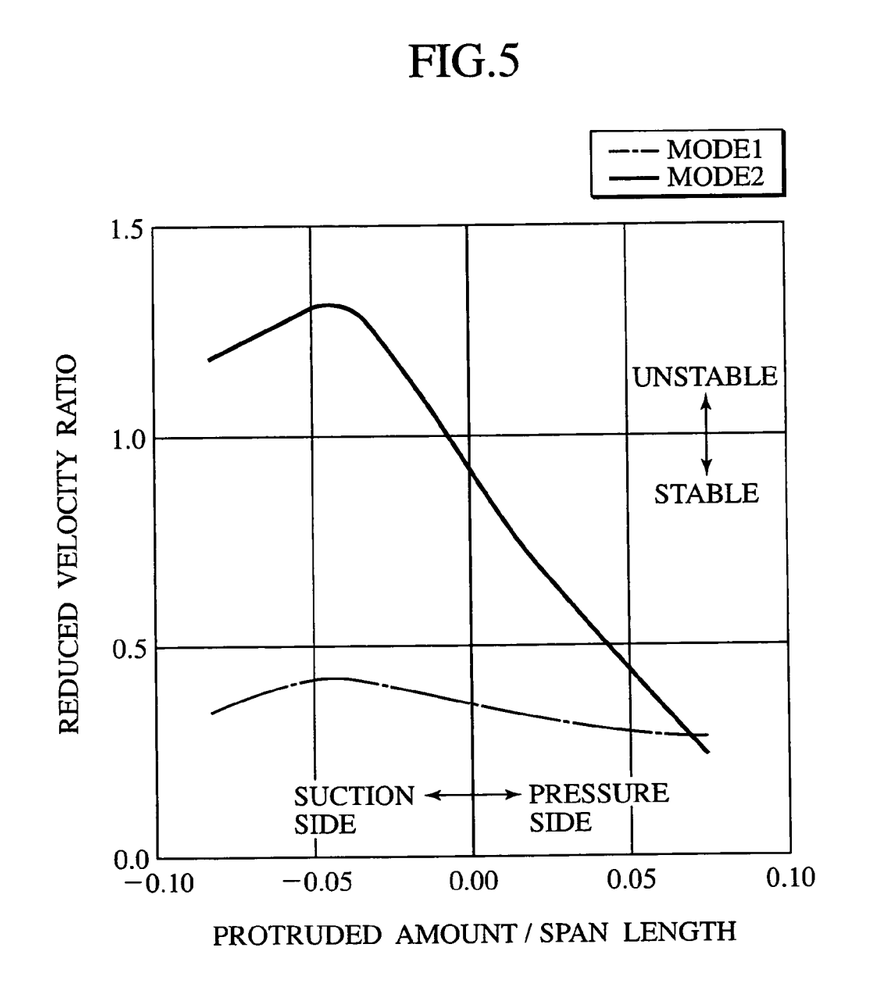
FIG. 5 shows analyzed results on flutters of the airfoils in the turbine nozzle.
Figure 6:
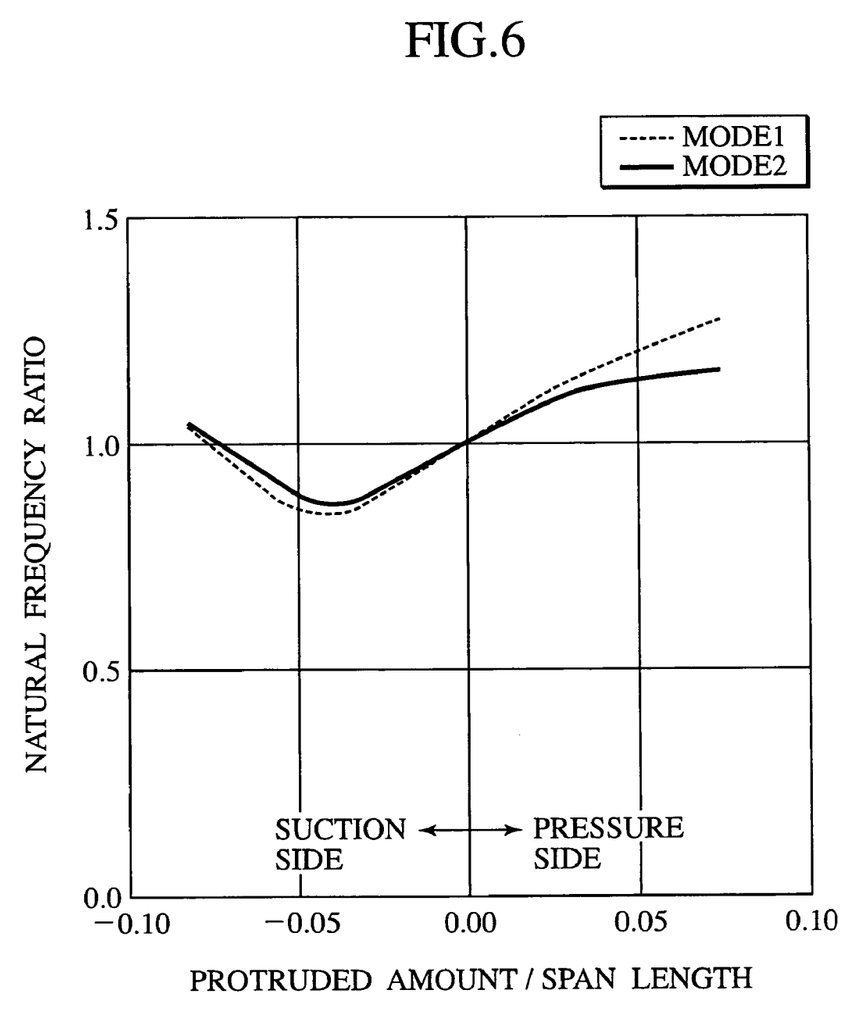
FIG. 6 shows analyzed results on flutters of the airfoils in the turbine nozzle.

FIGS. 5 and 6 shows analyzed results on flutters of the airfoil 47 in the turbine nozzle.

FIG. 5 shows a protruded amount of the airfoil 47 in relation to a Reduced Velocity ratio in the vibration modes 1 and 2. In FIG. 5, the amount of the curvature at the central portion along the stacking axis of the airfoil 47 (the distance between the high curvature portion $P_6$ and the central point $P_0$ shown in FIG. 3) is divided by the stacking axis of the airfoil 47 (the distance between the intersection $P_2$ and the intersection $P_4$ shown in FIG. 3) to indicate the quotient as a "protruded amount/span length" along the horizontal axis. In addition, the non-dimensional amount RV1 is divided by the non-dimensional amount RV2 to indicate the quotient as a "Reduced Velocity ratio" along the vertical axis.

If a value on the horizontal axis in FIG. 5 is equal to "0.00", the airfoil 47 does not curve. If a value on the horizontal axis is positive, the airfoil 47 curves toward the pressure side. If a value on the horizontal axis is negative, the airfoil 47 curves toward the suction side. If a value on the vertical axis in FIG. 5 is less than "1", the airfoil 47 is stable to flutters. If a value on the vertical axis in FIG. 5 is more than "1", the airfoil 47 is unstable to flutters.

In FIG. 5, a graph with a chain line indicates an analyzed result in the vibration mode 1 (a lower-degree vibration associated with flexure of the airfoil 47 in the suction side-pressure side direction). In addition, a graph with a solid line indicates an analyzed result in the vibration mode 2 (a lower-degree vibration associated with torsion of the airfoil 47).

It can be found in FIG. 5 that, the larger the protruded amount of the airfoil 47, the more the stability of the airfoil 47 in the vibration modes 1 and 2 increases. If the "protruded amount/span length" is equal to or more than "0.02", the "Reduced Velocity ratio" in the vibration mode 2 comes to about "0.7" or less. This is effective to reliably stabilize the airfoil 47 in the vibration mode 2.

FIG. 6 shows a protruded amount in relation to frequency ratio of the airfoil 47 on the vibration modes 1 and 2. In FIG. 6, a "protruded amount/span length" is indicated along the horizontal axis as is in FIG. 5. In addition, the of natural frequency of the airfoil 47 in the vibration modes 1 and 2 is divided by natural frequency of the airfoil 47 when it is not curved (the protruded amount/span length=0). The quotient is indicated along the vertical axis as an "natural frequency ratio".

The higher the natural frequency of the airfoil 47 and the larger the natural frequency ratio, the stability of the airfoil 47 to the flutter increases. Therefore, the larger the natural frequency ratio increases over "1", the stability of the airfoil 47 to the flutter increases. In FIG. 6, a graph with a dotted line indicates an analyzed result in the vibration mode 1, and a graph with a solid line indicates an analyzed result in the vibration mode 2.

It can be found in FIG. 6 that, the larger the protruded amount of the airfoil 47, the more the stability of the airfoil 47 to the vibration modes 1 and 2 increases. If the "protruded amount/span length" exceeds "0.03", however, an increase rate in the natural frequency in the vibration mode 2 turns slow.

According to the turbine nozzle of the embodiment, the high-C of airfoil 47 describe a parabola line that curves toward the pressure side of the airfoils 47. The high-C curve most at the center along the stacking axis of the airfoil 47 from a straight line that connects with a first intersection between the parabola line and an inner band 49 in the turbine nozzle and with a second intersection between the parabola line and an outer band 51 in the turbine nozzle. The maximum curvature falls within a range from 0.02 to 0.03-fold of the stacking axis of the airfoil. Therefore, as can be seen from FIGS. 5 and 6, during operation of the gas turbine engine 1, the flutter of the turbine nozzle can be prevented.

According to the turbine nozzle of the embodiment, the maximum curvature is designed equal to or less than 0.03. Therefore, the increase in the natural frequency ratio can be controlled slow as shown in FIG. 6. In addition, the maximum curvature can be prevented from uselessly increasing. Thus, it is possible to avoid the difficult production due to the larger curvature of the airfoil 47. In other words, the turbine nozzle provided with the airfoils 47 can be produced easily.

If the value of the protruded amount/span length is designed equal or close to "0.025", it is possible to suppress the flutter of the airfoil 47 and keep the best balance with the easy production of the turbine nozzle provided with the airfoil 47.

In the above embodiment, among the turbine nozzles that construct the row of stationary airfoils for low-pressure turbine 45 in the gas turbine engine 1, the turbine nozzle arranged at the most front location (close to the high-pressure turbine 35) is exemplified. Alternatively, the above embodiment is applicable to other turbine nozzles (including the high-pressure turbine nozzle) such as the turbine nozzles that construct the middle stage in the row of stationary airfoils for low-pressure turbine 45. Further, the above embodiment can also be applied to gas turbine engines provided with one or plural turbine shafts such as three shafts or more.

According to the present invention, an effect can be achieved to provide an easily redesign method for vane in order to prevent the flutter during operation of the gas turbine engine.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. A turbine nozzle, comprising:
   airfoils stacked along a stacking axis,
   wherein high curvature portions on a suction surface in airfoil sections successively formed along the stacking axis describe a parabola line that curves toward a pressure side of the airfoil when seen from a front or a rear of the turbine nozzle, wherein a point of maximum curvature in each airfoil is located at a midpoint along the stacking axis of a straight line that connects a first intersection between the parabola line and an inner band in the turbine nozzle with a second intersection between the parabola line and an outer band in the turbine nozzle, and wherein a distance of the point of maximum curvature to the straight line is within a range from 2 to 3% of a distance between the first and second intersections along the stacking axis of the airfoil.

2. The turbine nozzle according to claim 1, wherein an airfoil reduced velocity ratio for a lower-degree vibration associated with torsion is 0.7 or less.

3. The turbine nozzle according to claim 2, wherein a ratio of a natural frequency of the airfoil to a natural frequency of an airfoil without curvature is greater than 1.0.

4. The gas turbine nozzle according to claim 1, wherein a trailing edge of each airfoil is parabolic.

5. A low pressure turbine of a gas turbine comprising the turbine nozzle according to claim 1.

6. A high pressure turbine of a gas turbine comprising the turbine nozzle according to claim 1.

7. A gas turbine engine comprising the turbine nozzle according to claim 1.

8. A gas turbine engine having a turbine nozzle with redesigned vanes, the turbine nozzle being according to claim 1.

9. A turbine nozzle, comprising:
   an inner band;
   an outer band; and
   a plurality of airfoils disposed between the inner and outer bands, each airfoil of the plurality having a convex pressure side, a concave suction side, an X axis along a stacking direction, and a Y axis perpendicular to the X axis, the X axis being defined by a straight line connecting first and second points at intersections of the airfoil with the inner and outer bands, respectively, the first and second points defining portions of maximum airfoil curvature on the concave suction side of airfoil cross sections perpendicular to the X axis, and the Y axis intersecting the X axis at a midpoint between the first and second points, wherein concave suction side profiles defined by cross sections parallel to X-Y planes are parabolic when seen from a front or a rear of the turbine nozzle, and $$0.02H \leq Y_{max} \leq 0.03H,$$

where $Y_{max}$ is the Y coordinate of the midpoint and H is the distance along the X axis between the first and second points.

10. The turbine nozzle according to claim 9, wherein an airfoil reduced velocity ratio for a lower-degree vibration associated with torsion is 0.7 or less.

11. The turbine nozzle according to claim 10, wherein a ratio of a natural frequency of the airfoil to a natural frequency of an airfoil without curvature is greater than 1.0.

12. A low pressure turbine of a gas turbine comprising the turbine nozzle according to claim 9.

13. A high pressure turbine of a gas turbine comprising the turbine nozzle according to claim 9.

14. A gas turbine engine comprising the turbine nozzle according to claim 9.

15. The gas turbine nozzle according to claim 9, wherein a trailing edge of each airfoil is parabolic.

16. A gas turbine engine having a turbine nozzle with redesigned vanes, the turbine nozzle being according to claim 9.

* * * * *